US012776975B2

(12) United States Patent
Li et al.

(10) Patent No.: US 12,776,975 B2
(45) Date of Patent: Oct. 27, 2026

(54) MACHINE LEARNING ANOMALY DETECTION ON QUALITY OF SERVICE NETWORKING METRICS

(71) Applicant: HULU, LLC, Santa Monica, CA (US)

(72) Inventors: Tuo Li, Irvine, CA (US); Vahidreza Arbab, Los Angeles, CA (US)

(73) Assignee: HULU, LLC, Santa Monica, CA (US)

(*) Notice: Subject to any disclaimer, the term of this patent is extended or adjusted under 35 U.S.C. 154(b) by 756 days.

(21) Appl. No.: 18/327,579

(22) Filed: Jun. 1, 2023

(65) Prior Publication Data

US 2024/0406088 A1 Dec. 5, 2024

(51) Int. Cl.
*G06N 20/00* (2019.01)
*H04L 41/16* (2022.01)
*H04L 43/0823* (2022.01)

(52) U.S. Cl.
CPC ......... *H04L 43/0823* (2013.01); *G06N 20/00* (2019.01); *H04L 41/16* (2013.01)

(58) Field of Classification Search
None
See application file for complete search history.

(56) References Cited

U.S. PATENT DOCUMENTS 11,658,994 B2 * 5/2023 Johnston ............. H04L 63/1441 726/22
2016/0342903 A1 * 11/2016 Shumpert ............. G06F 11/008
2018/0027004 A1 * 1/2018 Huang ..................... H04L 43/04 726/23
2021/0099473 A1 * 4/2021 Fainberg ............. H04L 63/1416

OTHER PUBLICATIONS

Boukerche, Azzedine, Lining Zheng, and Omar Alfandi. "Outlier detection: Methods, models, and classification." ACM Computing Surveys (CSUR) 53.3 (2020): 1-37. (Year: 2020).*

Putina, Andrian, and Dario Rossi. "Online anomaly detection leveraging stream-based clustering and real-time telemetry." IEEE Transactions on Network and Service Management 18.1 (2020): 839-854. (Year: 2020).*

Apostol, Elena-Simona, et al. "Change point enhanced anomaly detection for IoT time series data." Water 13.12 (2021): 1633. (Year: 2021).*

Fukuda, Kensuke. "On the use of weighted syslog time series for anomaly detection." 12th IFIP/IEEE International Symposium on Integrated Network Management (IM 2011) and Workshops. IEEE, 2011. (Year: 2011).*

Extended European Search Report for Application No. 24158509.0, dated Jul. 17, 2024, 7 pgs.

(Continued)

*Primary Examiner* — Hal Schnee
(74) *Attorney, Agent, or Firm* — Kwan & Olynick LLP

(57) ABSTRACT

In some embodiments, a method receives a first instance of data for anomaly detection. The first instance of data includes values from multiple variables. The first instance of data is stored in a queue. The method weights instances of data in the queue based on data changing over time and projects the instances of the data in the queue into a space. A point in the space represents a correlation of the values for the multiple variables for a respective instance of data. A boundary is generated based on the points in the space. Then, the method determines a point in the space that is considered an anomaly based on the boundary.

20 Claims, 12 Drawing Sheets

(56) References Cited

OTHER PUBLICATIONS

Jeng et al: "Adaptive process monitoring using efficient recursive PCA and moving window PCA algorithms", Journal of the Taiwan Institute of Chemical Engineers, Elsevier, Amsterdam, NL, val. 41, No. 4, Jul. 1, 2010 (Jul. 1, 2010), pp. 475-481, XP027141883, ISSN: 1876-1 070 [retrieved on Jul. 1, 2010].

* cited by examiner

MACHINE LEARNING ANOMALY DETECTION ON QUALITY OF SERVICE NETWORKING METRICS

BACKGROUND

A system may employ an anomaly detection process to detect anomalies in data. It may be important to detect anomalies in real time such that any possible remedial actions can be performed as soon as possible. In some examples, a content delivery system may receive quality of service (QoS) data from different entities that are delivering content, such as content delivery networks and/or Internet Service Providers. However, it may be difficult to analyze the data for anomalies. For example, training a model to analyze the data may not address data drift, seasonality challenges, or be fast enough. For example, data may drift over time, which may require a new complete set of data in bulk to re-train the model. Also, seasonality may occur where different patterns may be experienced, which requires the model to be retrained again with a new batch of training data. The above training may slow down the process of detecting anomalies and cause a lag in the detection based on the retraining process.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
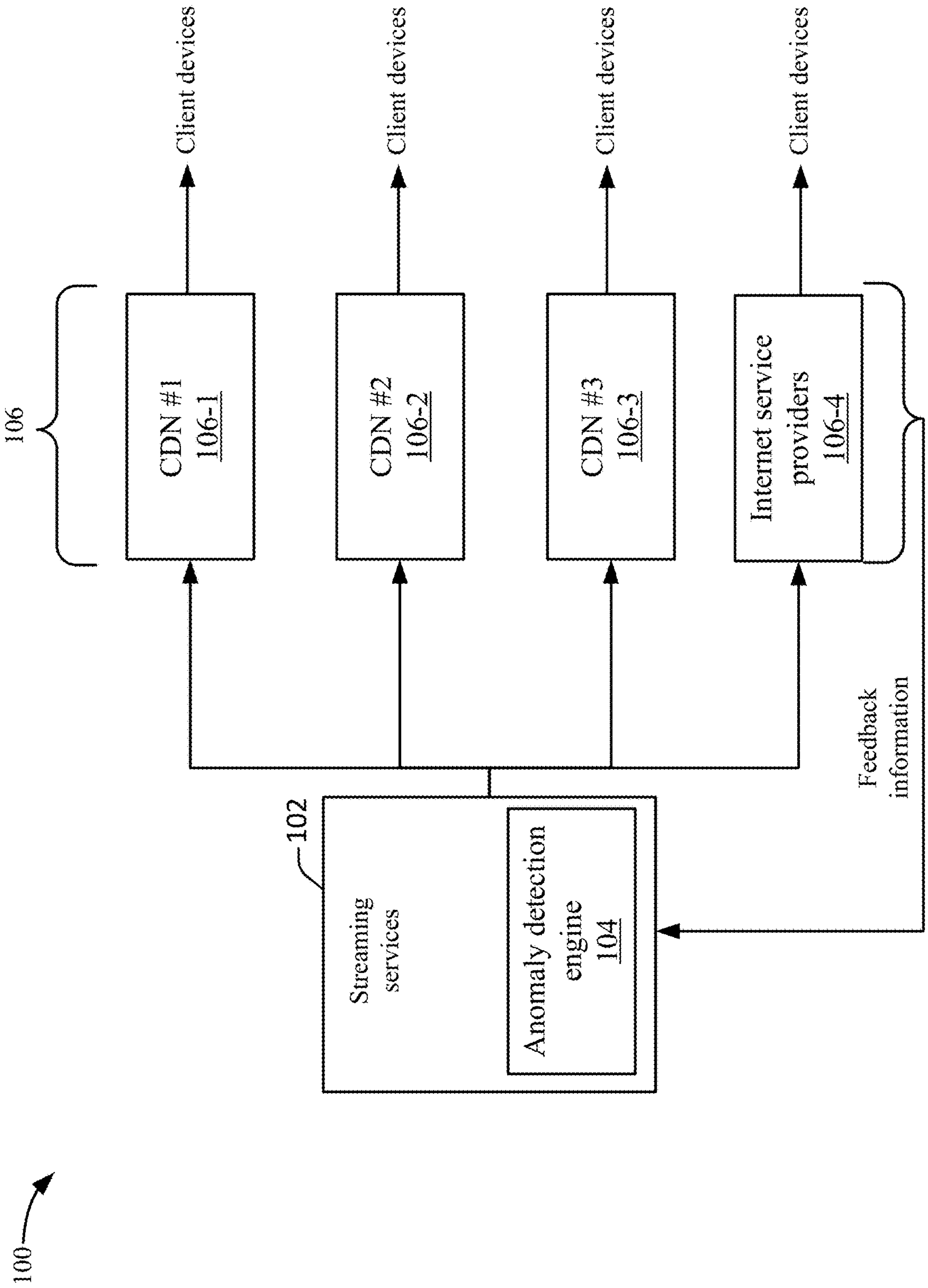
FIG. 1 depicts a simplified system of a content delivery system according to some embodiments.

Described herein are techniques for a data analysis system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system performs anomaly detection of data. In some examples, the system may operate a content delivery system that delivers content to client devices. The data that is monitored for anomalies may be based on the delivery of the content, such as quality of service (QOS) data that includes data that measures the quality of service while delivering content to client devices. However, the anomaly detection process may be used to prevent and detect anomalies for any system issues that may occur in different fields, such as network security, platform health monitoring, industrial Internet of things (IoT), user experience and management, etc.

The anomaly detection may detect anomalies in the data quickly, which allows a root cause of an issue to be identified and the issue to be addressed promptly. This may ensure a superior viewing experience at client devices as issues are resolved. In some examples, the system may operate in hundreds of geographical regions over numerous delivery entities, such as content delivery networks (CDNs), and Internet Service Providers (ISPs), that stream thousands of different content instances. The anomaly detection process needs to be scalable to monitor and track different QoS metrics that can detect anomalies in real-time at a large number of entities.

The system uses a machine learning-based, automatic, traffic loading agnostic, and start-type agnostic anomaly detection process that can monitor multiple variables that may be correlated in real time. The process may detect anomalies in correlations of multiple variables. For example, the two variables may be time and number of viewers. When the number of viewers at a time is abnormal, the anomaly may be detected. For example, 10 million viewers at 1:00 am may be an anomaly, but 1 million viewers at 1:00 am may be normal because it is expected that viewership is lower at 1:00 am. The process may be traffic loading agnostic in that the process may start with any type of traffic load on a delivery entity. For example, a content delivery network may be provided with an incrementally increasing amount of traffic load after the content delivery network first starts. In some examples, the content delivery network may be provided with 1% of a traffic load at the start, which is increased to 5% of a traffic load after 30 days, which is increased to 50% of a traffic load after another 30 days, etc. until 100% of a traffic load is reached. The anomaly detection process may be used at any amount of traffic load and dynamically learns to detect anomalies as the traffic load is increased. The anomaly detection process may be start-type agnostic in that the model may be used for a cold start, which does not use any previous history of data to a warm start that may use historical data for training. The following will describe the use of weights to enable anomaly detection while data changes over time.

System

FIG. 1 depicts a simplified system 100 of a content delivery system according to some embodiments. System 100 includes streaming services 102 and delivery entities 106. Delivery entities 106 may include networks that deliver data, such as content delivery networks (CDNs) 106-1 to 106-N, Internet Service Providers (ISPs) 106-4, or other delivery networks. The data may be content, such as videos, audio, etc. Streaming services 102 may include computing devices that may coordinate the delivery of content to client devices, such as requests for content are received, and the requests are sent to delivery entities 106, which deliver the content to the client devices. As mentioned above, the anomaly detection process may be used in fields other than content delivery, but content delivery will be used as an example. In other fields, the data that is analyzed may be different based on the service being provided. For example, network security may analyze requests for data being processed by a network for anomalies.

An anomaly detection engine 104 may use a model that detects anomalies in data, such as data that is based on the delivery of content from delivery entities 106 to client devices. As will be described in more detail below, anomaly detection engine 104 uses machine learning to analyze the feedback information received from delivery entities 106 to detect anomalies. The feedback information may be based on the delivery of content from delivery entities 106 to client devices. The model receives values for variables and determines outliers in the data that may be considered anomalies.

The data received may be based on a time series of instances of data. For example, anomaly detection engine 104 receives data at time granularities. In some embodiments, streaming services 102 may receive data and generate time series data sets for every second, minute, hour or any other granularity. Each data set may be associated with a time in the time series. For example, data may be continuously received, and streaming services 102 may generate an instance of data for each minute from the data received in the last minute. This process occurs for each minute to create instances of data for each minute. An anomaly may be data from a first time that is considered an anomaly from other data at other times. As will be described below in more detail, a boundary may be used to determine anomalous data.

Each instance of data may have values for multiple variables associated with different metrics. For example, there may be data for a number of playback attempts, a number of video startup failures, a number of video startup exits, a number of playback failures, etc. These variables may be correlated in that the experience of one of the events may affect the experience of another metric. Anomaly detection engine 104 evaluates the correlations among the different variables and detects outliers from the correlated data. The variables may be interacting with each other. Thus, the interactions between variables are reflected in determining inlier or outlier statuses. If variables are interacting normally, then they are not outliers. If variables are interacting anomalously, then they could be outliers. For example, there may be two variables of viewers and time of day. There may be 10 million viewers at 5:00 μm, and this may be considered inline of expected correlations. However, there may be 10 million viewers at 1:00 am, and this may be considered an outlier of expected correlations. That is, there may be an expected 1 million viewers at 1:00 am because this is a time period when most viewers are sleeping. The correlation is examined for anomalies, rather than just the number of viewers irrespective of time.

Anomaly detection engine 104 may output the anomalies that are detected. For example, anomaly detection engine 104 may output different times in the time series and the variables in which an anomaly is detected. Then, streaming services 102 may perform an action to resolve any problems that have been occurring. For example, the action may be to determine acceptable ranges of values for the variables, and send the ranges to a delivery entity 106 with a notification of the problem. Also, anomaly detection engine 104 may also troubleshoot an issue associated with the anomaly.

The following will now describe the anomaly detection process in more detail.

Anomaly Detection Process

Anomaly detection engine 104 may monitor each delivery entity 106 separately and perform the anomaly detection process for each delivery entity 106. That is, anomaly detection engine 104 analyzes data for each delivery entity 106 separately for anomalies. In other embodiments, anomaly detection engine 104 may monitor data for multiple delivery entities 106 together for anomalies. However, identification of which delivery entity in which an issue occurred may be required when data is combined for multiple delivery entities 106.

Figure 2:
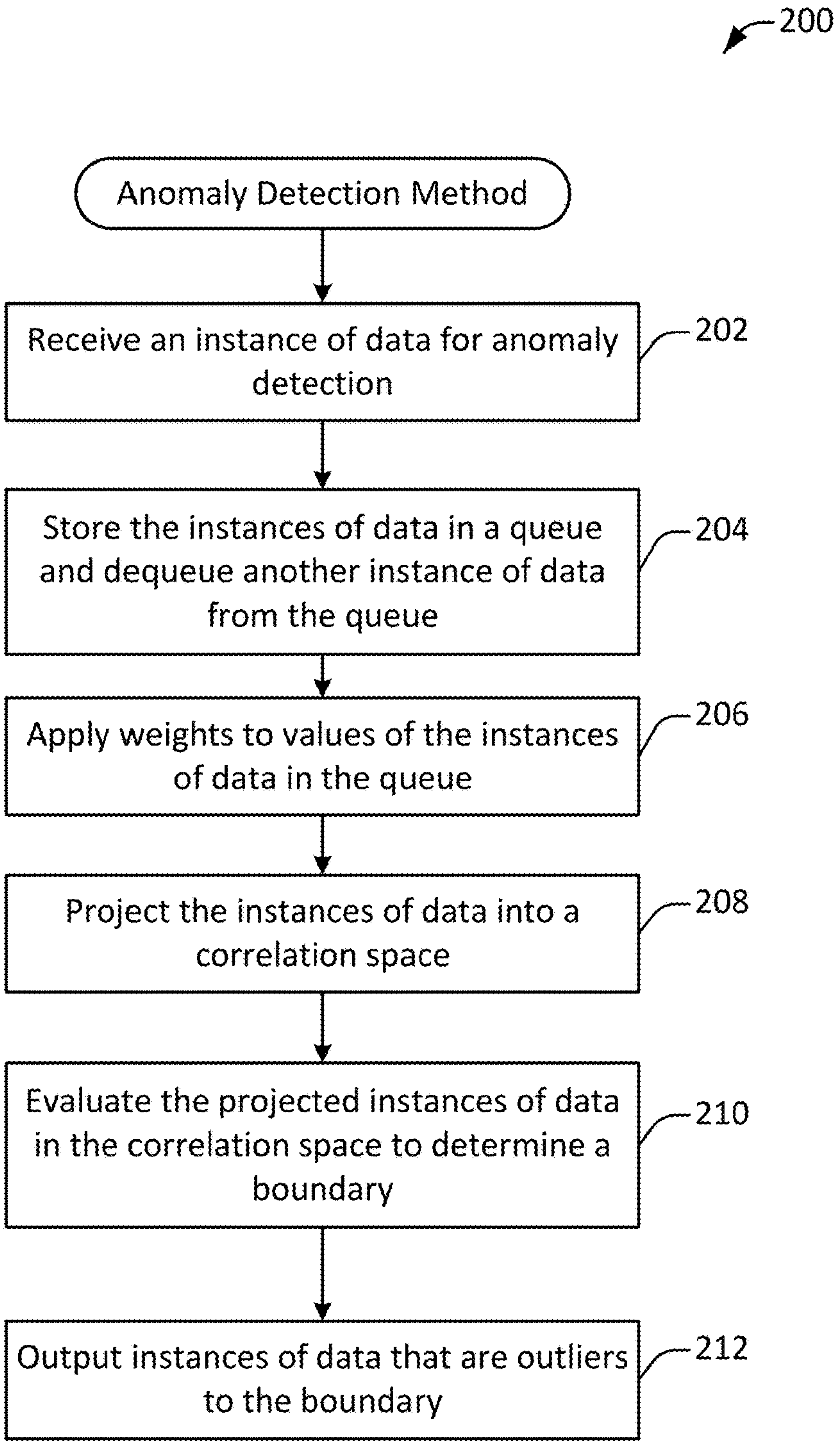
FIG. 2 depicts a simplified flowchart of a method for detecting anomalies according to some embodiments.

FIG. 2 depicts a simplified flowchart 200 of a method for detecting anomalies according to some embodiments. At 202, anomaly detection engine 104 receives an instance of data for anomaly detection. The instance of data may be for a time in a time series, such as the data may be for a minute in a time series. In some embodiments, values for multiple variables may be received from delivery entities 106 based on different metrics that are used to evaluate quality of service. The data may be received based on delivery of content from multiple delivery entities to clients, and aggregated for the instance of data, such as for a minute of time.

At 204, anomaly detection engine 104 stores the instance of data in a queue and may possibly dequeue other instances of data from the queue. For example, the just received instance of the data for a time is stored in the queue. Then, an instance that was already stored in the queue may be removed from the queue. In some embodiments, a last in, first out process is used where the oldest instance of data is removed when the new instance of data is inserted in the queue (or an equal number of instances is removed when new instances are inserted in the queue). The dequeuing of instances of data may not be needed in some cases. For example, in a cold start process, which will be described in more detail below, the queue may not be full, such as a queue may store one hundred entries and entries are only dequeued after one hundred entries are stored in the queue. As the instances of data are received, anomaly detection engine 104 stores the instances in the queue until the queue becomes full. Thereafter, when a new instance of data is received, the oldest instance of data may be removed from the queue.

At 206, anomaly detection engine 104 may apply weights to the values of the data in the queue. The weighting of the instances may allow anomaly detection engine 104 to apply more weight to instances that may be considered more important. In some embodiments, the weighting may allow anomaly detection engine 104 to prioritize current trends and patterns over outdated ones. For example, when data trends drift or seasonality patterns occur, the weighting may allow anomaly detection engine 104 to detect the data drift or seasonality patterns more quickly by weighting the more recent instances of data higher than the older instances of data. Additionally, the weights may be used when there are pivot points in the data that are detected. For example, when new observations of instances of data significantly deviate from the previous instances of data, anomaly detection engine 104 detects the pivot point and then assigns higher weights to the newer incoming instances of data that are received after the pivot point and lower weights to the older instances of data that are received before the pivot point. This may improve the detection of anomalies by weighting data that may not be relevant to detect anomalies less, and the outdated data may be even can be excluded from the analysis. Examples of applying weights will be described in more detail in FIGS. 8-10.

At 208, anomaly detection engine 104 projects the data into a correlation space. The correlation space may be a space that represents the correlation of the multiple variables that are included in the instance of data. In some embodiments, the correlation space may be a higher dimensional space that may represent the correlations of the values of the multiple variables. A point in the correlation space may represent the values from the variables in the instance of data. Each instance of data may be projected into the correlation space as a point. However, an instance of data may be projected into the correlation space as multiple points. The projection will be discussed in more detail in FIGS. 3-5A.

At 210, anomaly detection engine 104 evaluates the projected instances of data in the correlation space to determine a boundary. For example, a boundary may be a threshold that indicates which instances are acceptable, such as inliers to a boundary. Instances that do not meet the threshold, such as are outside of the boundary may be instances that may be anomalies. The boundary may be determined based on analysis of the points in the correlation space. The boundary determination will be discussed in more detail in FIGS. 5B and 6.

At 212, anomaly detection engine 104 outputs instances of data that are outliers to the boundary. For example, the time in the time series of the instances that are outside of the boundary may be output. Then, streaming services 102 may analyze the outliers and determine any remedial actions that can be performed. The analysis will be discussed in more detail in FIGS. 7A-7B.

Multi-Variable Correlation

Figure 3:
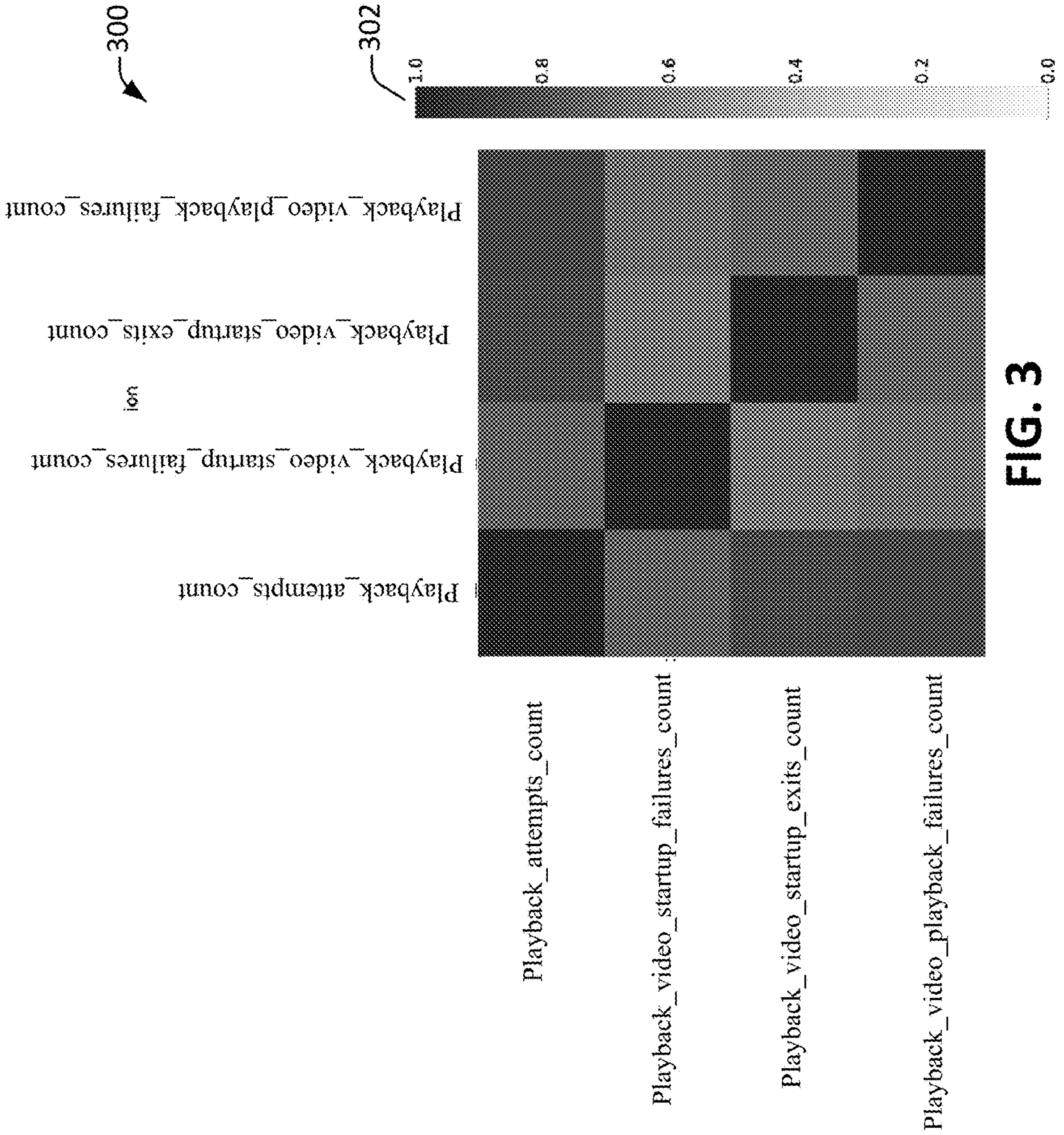
FIG. 3 depicts an example of multiple variables that may be received for instances of data according to some embodiments.

FIG. 3 depicts an example 300 of multiple variables that may be received for instances of data according to some embodiments. As shown, variables may be a playback attempts count, a playback video startup failures count, a playback video startup exits count, and a video playback failures count. The value count for the variable may be based on respective events occurring during content delivery. The playback attempts may be a number of playback attempts that occur in the time period, the playback video startup failures may be a number of startup failures that occur during startup of the content, the playback video startup exits may be the number of exits from playback that occur during startup, and the playback video playback failures may be the number of failures that occurred during playback. Other variables may also be appreciated.

The variables may be correlated with each other. For example, the number of playback video startup failures may be correlated with the number of playback attempts. The number of playback attempts may affect the number of playback video startup failures as more playback attempts may cause more playback startup failures. To analyze correlations for anomalies, the correlation among variables may be analyzed for anomalies. The different degrees of correlation between variables is shown at 302 according to some embodiments. The correlation may be expressed from a range of 0.0 to 1.0, where values closer to 1.0 indicate more correlation between variables. For example, playback video startup exits count may be correlated with the video playback failures count with a value of 0.8 because an exit may be based on failures occurring. Also, playback video startup failures count may be correlated with the video playback failures count with a value of 0.6 because failures may result in some failures at startup. Also, a higher correlation may be the number of viewers and the time of day.

Multi-Variable Projection

Figure 4:
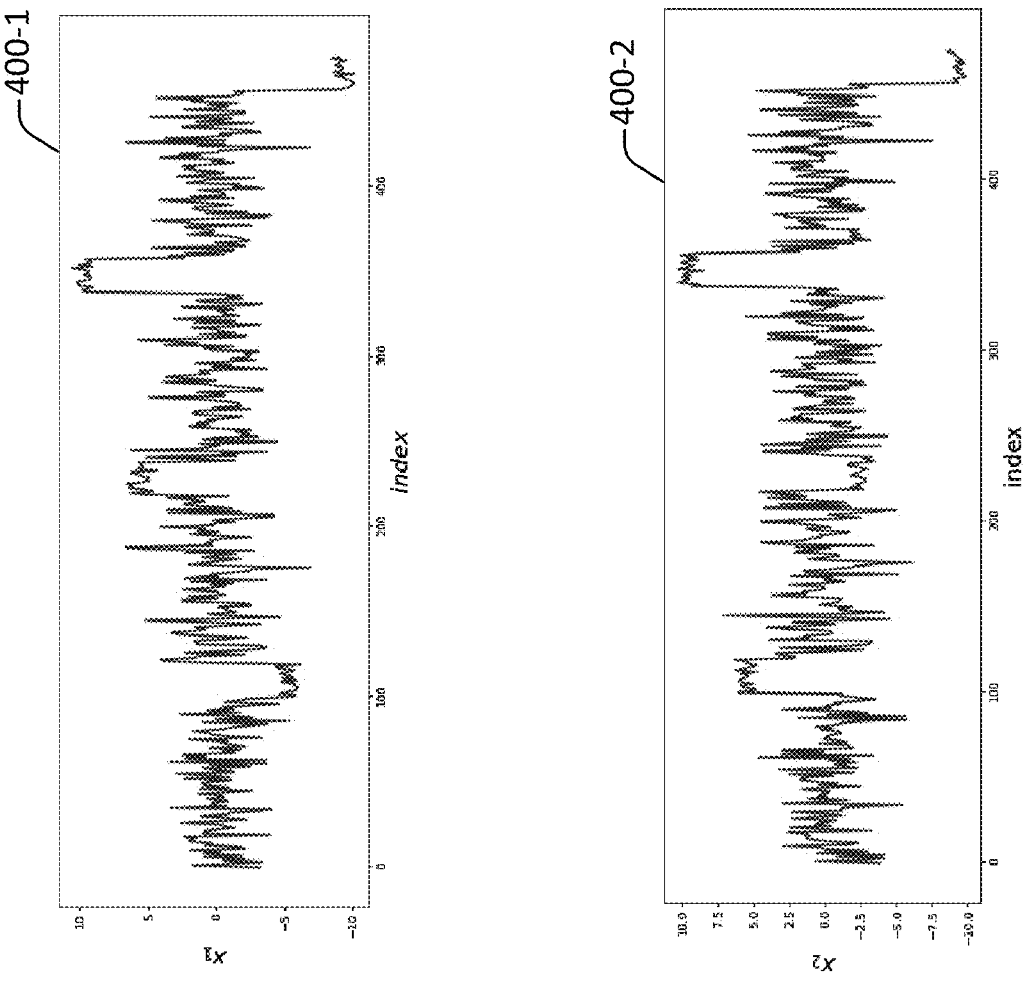
FIG. 4 shows an example of values for two variables over time according to some embodiments.

FIG. 4 shows an example of values for two variables over time according to some embodiments. At 400-1, a graph for a first variable x1 is shown over time and at 400-2, a graph for a variable x2 over time is shown. The value of the variable may be represented on the Y axis and an index that represents time is shown on the X axis. In some examples, the variable x1 may be playback attempts count, and the variable x2 may be playback video startup failures count, but other variables may be appreciated. Each variable may have an associated graph of values over time. The values for the variables may be for one delivery entity 106, multiple delivery entities 106, etc.

Figure 5A:
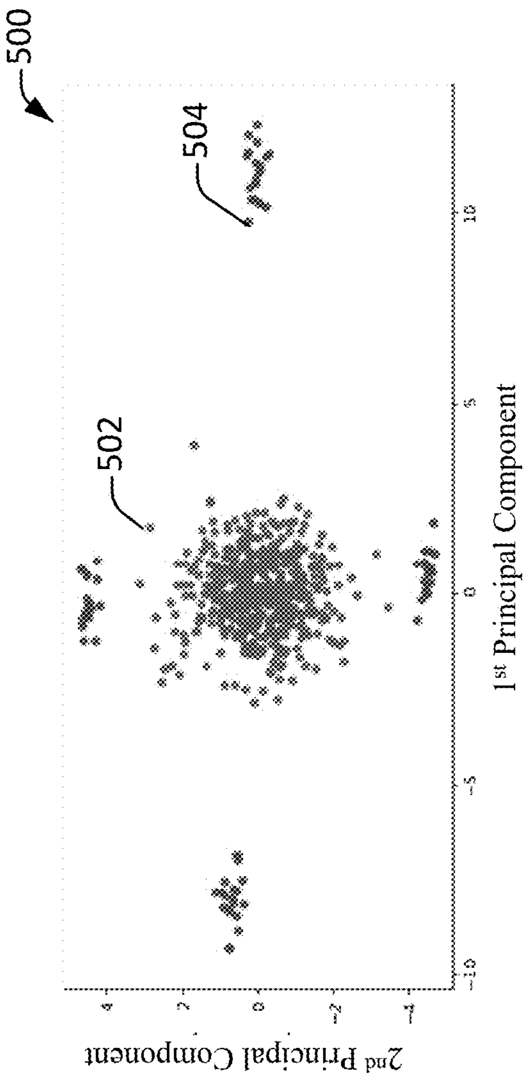
FIG. 5A depicts a graph of the instances of data metrics being projected into a space according to some embodiments.

To analyze the variables together, the values of the variables may be projected into a space based on the correlation of the variables. FIG. 5A depicts a graph 500 of the instances of data being projected into a space according to some embodiments. The space may represent the values and correlation among the variables in a different dimension, such as using a 1$^{st}$ principal component on the X axis and a second principal component on the Y axis. The 1$^{st}$ principal component and the 2$^{nd}$ principal component may represent the correlation of multiple variables in the space. In some embodiments, a higher dimension space may be used where a point in the space represents the correlation of all the values for the variables for the instance of data at a time. For example, at 502, for a time T=1, the values of the variables for time T=1 is represented by a point. Also, at 504, for a time T=2, the values of the variables for time T=2 is represented by a point. Other points represent other instances of data at another time.

In some embodiments, anomaly detection engine 104 may use a transformation to project the dimensional data from the instances of data into a space. In some embodiments, the process to perform the transformation may be singular value decomposition (SVD). However, other methods may be used. In some embodiments, the space is referred to as a high dimensional space. Anomaly detection engine 104 may use a Principal Component Analysis (PCA) transformation to analyze the data that includes a high number of dimensions and features per time and reduce the dimensionality of the variables in the instance of data. The transformation may linearly transform the data into a new coordinate system where the variation in the data can be described with fewer dimensions than the initial data. Although principal component analysis is described, other data transformation techniques may be used. For example, the transformation does not have to be into a higher dimensional space, but could be to a lower dimensional space.

Figure 5B:
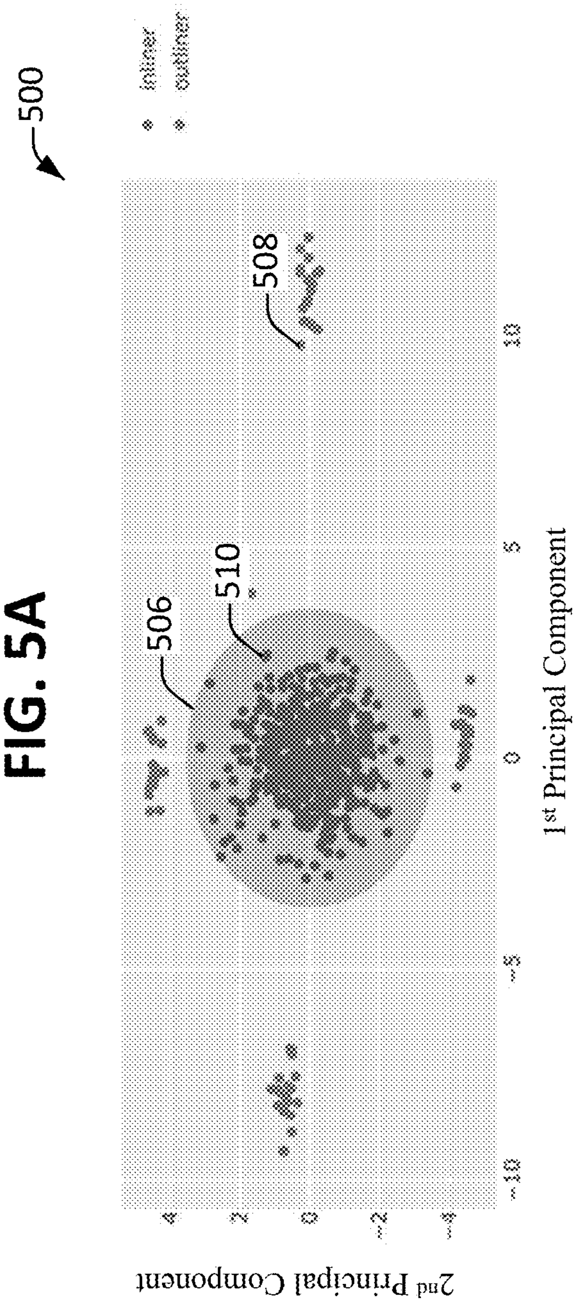
FIG. 5B depicts a boundary that can be generated based on a distribution of points in the space in the graph according to some embodiments.

FIG. 5B depicts a boundary 506 that can be generated based on a distribution of points in the space in graph 500 according to some embodiments. Anomaly detection engine 104 may analyze the values of points in graph 500 to generate boundary 506. The boundary may be generated using different methods. For example, anomaly detection engine 104 may use a process to generate the boundary 506 from the distribution of points in the space. Boundary 506 may be determined using different methods. The positioning of points in the space and weights assigned to the points may be analyzed to determine a boundary. For example, a cluster of points in one area of the space may cause a boundary to be drawn closely around the cluster if only a small number of sparsely located points are found in the space. Also, if a first cluster is weighted higher than a second cluster that is weighted lower, the first cluster will have more influence on drawing boundary 506. One way to form the boundary is by calculating the radius e.g., averaging of the distance of historical points from the center. Other ways may include 1) picking up percentiles of the historical points, 2) resampling the historical points and calculating mean or median.]

As shown, inliner points are shown in blue and outliner points are shown in red based on boundary 506. For example, an outlier point outside of boundary 506 is shown at 508 in the color red. An outlier point does not meet a threshold set by boundary 506 (e.g., is outside of boundary 506). Also, an inliner point is shown at 510 in the color of blue. An inliner point may meet the threshold (e.g., is inside of boundary 506). Other inliner points with values within boundary 506 are shown in blue and other outlier points with values outside of boundary 506 are shown in red. Although outside of boundary 506 and inside of boundary 506 is described, the threshold may be applied in other ways, such as inliner points may be less than a threshold and outlier points may be greater than a threshold.

Figure 6:
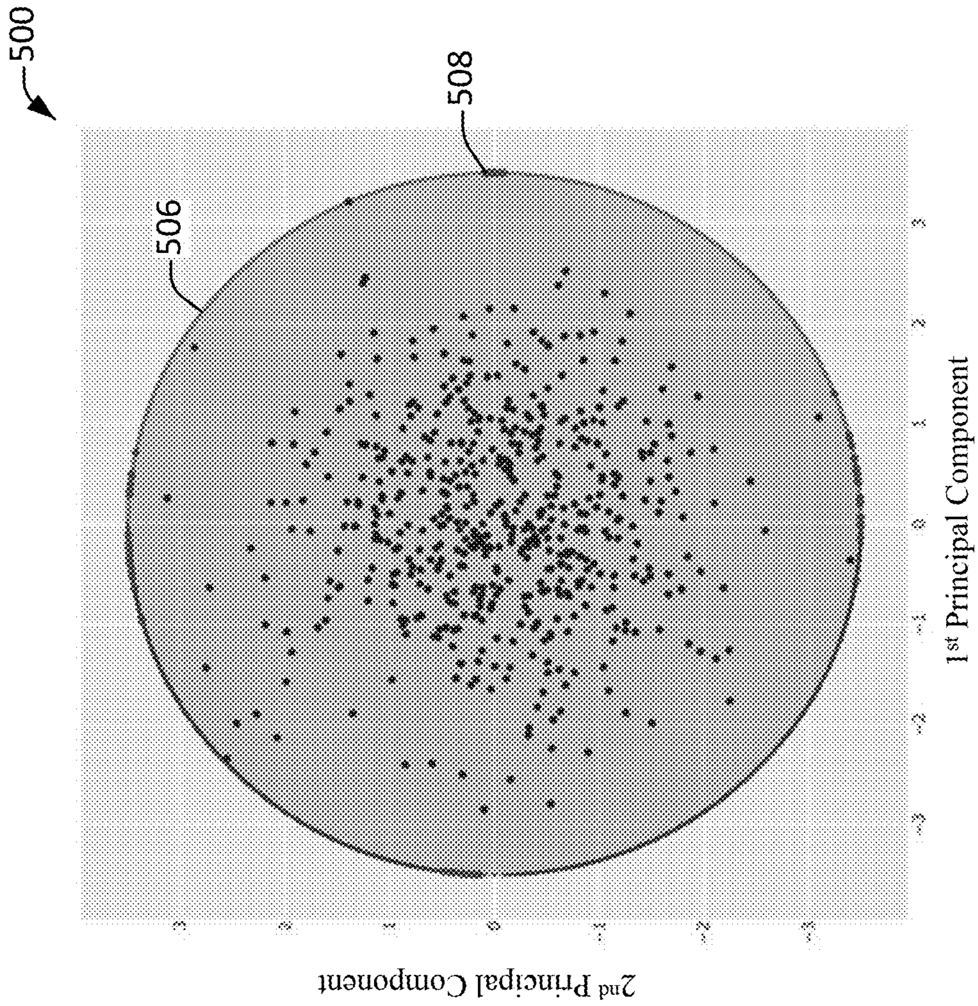
FIG. 6 shows an example of transforming the outlier values such that the outlier points reside on a boundary according to some embodiments.

The outlier points may be transformed to be values on boundary 506. FIG. 6 shows an example of transforming the outlier values such that the outlier points reside on boundary 506 according to some embodiments. The transformed points on boundary 506 are shown in red. The transformation of the points may be used to determine values for the outlier points that would make them not be anomalies. Different methods may be used to move the outlier points to determine the values for the outlier points on boundary 506. For example, the space may be shrunk such that the outlier points are moved inward to boundary 506. As shown, point 508 from FIG. 5B is shown as being on boundary 506 in FIG. 6 and not outside of boundary 506. Other outlier points in red may be similarly moved to points on boundary 506.

Figure 7A:
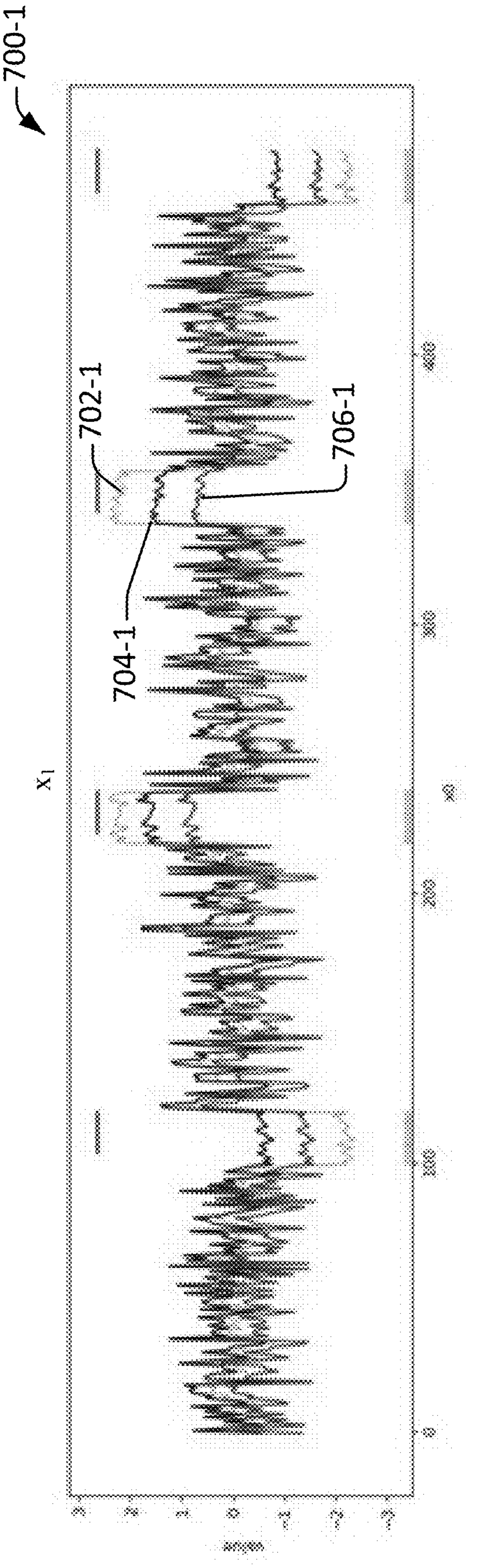
FIG. 7A depicts the original values from the first variable x1 in FIG. 4.
Figure 7B:
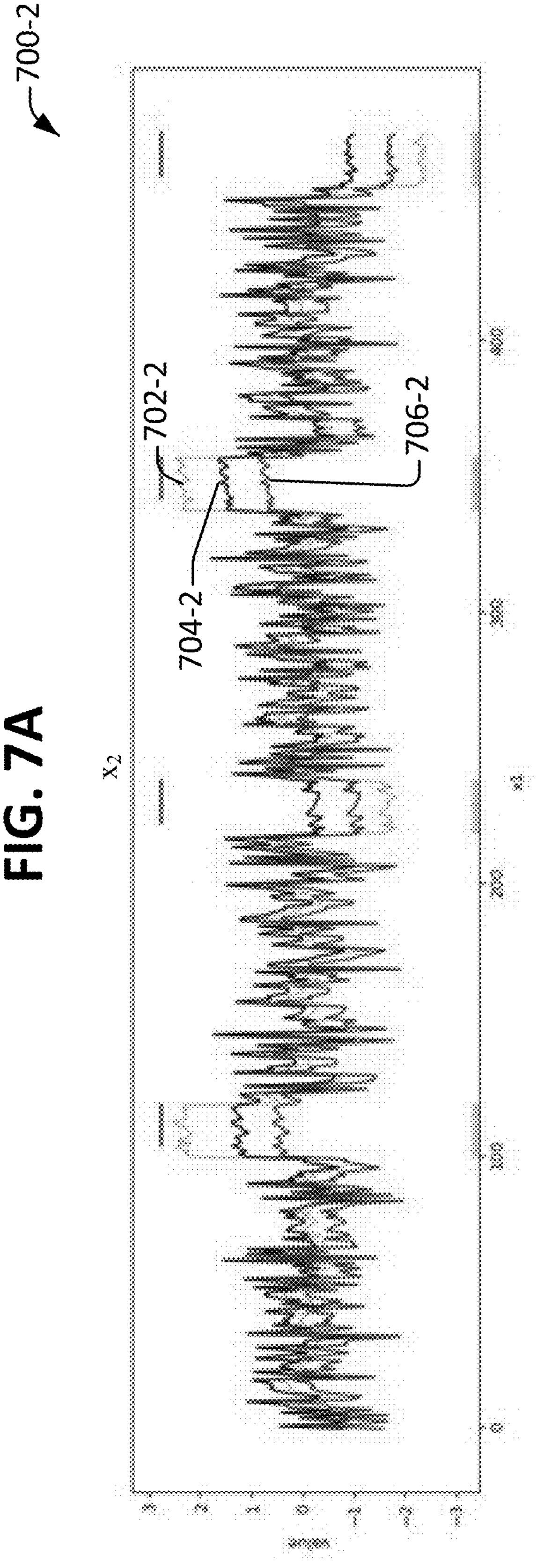
FIG. 7B depicts the original values from the second variable x2 in FIG. 4.

The use of the values on boundary 506 may be to determine a range of values for the outlier points that would be valid. FIGS. 7A and 7B depict the ranges according to some embodiments. FIG. 7A depicts the original values from the first variable x1 at 400-1 in FIG. 4 and FIG. 7B depicts the original values from the second variable x2 at 400-2 in FIG. 4. The values from the transformed space in FIG. 5B may be transformed back to values in the original spaces for multiple variables, such as shown in FIG. 4 for variables x1 and x2. The original values are shown in a line 702-1 in red and a line 702-2 in red. The acceptable ranges are shown in blue in a line 704-1 and a line 706-1 in FIG. 7A, and in green a line 704-2 and a line 706-2 in FIG. 7B. Line 704-1 or line 704-2 may represent the high value of the range and line 706-1 or line 706-2 may represent the low value of the range that would make the outlier value not be an anomaly. The high value may be the value on one side of boundary 506 as denoted in blue on boundary 506 in FIG. 6 and the low value may be a value on an opposite side of boundary 506 as denoted in green on boundary 506 in FIG. 6. The values on the blue side may be positive and the values on the green side of boundary 506 may be negative. Taking a value in the middle and values on the blue side and the green side may be used to determine a high value and the low value. Other methods may also be used to determine the high and low values, such as a single threshold, standard deviations, etc. may be used. Anomaly detection engine 104 may use the high and low values for points to troubleshoot the issue. For example, anomaly detection engine 104 may troubleshoot the issue to determine a root cause. Also, anomaly detection engine 104 may send an alert to a delivery entity 106 with information for the issue, including the time of the instance and the low and high values for the range of acceptable values. For example, the low value may be a shortest acceptable buffering time and a high value may be a longest acceptable buffering time.

Analysis Process

Anomaly detection engine 104 may improve the analysis of data when certain conditions occur, such as incremental loading and data drift. Anomaly detection engine 104 may weight instances of data in the queue to account for different patterns that may occur over time, such as based on incremental loading and data drift. The use of the weights may be useful in content delivery, which may often experience data drift or incremental loading scenarios. The data drift may occur as viewing patterns of content change. Anomaly detection engine 104 is able to adapt to the data drift in real-time. Also, anomaly detection engine 104 can be used in an incremental load scenario with having to wait to perform retraining with a large batch of data. Rather, anomaly detection engine 104 learns the new patterns to detect anomalies as load increases (or decreases).

Figure 8:
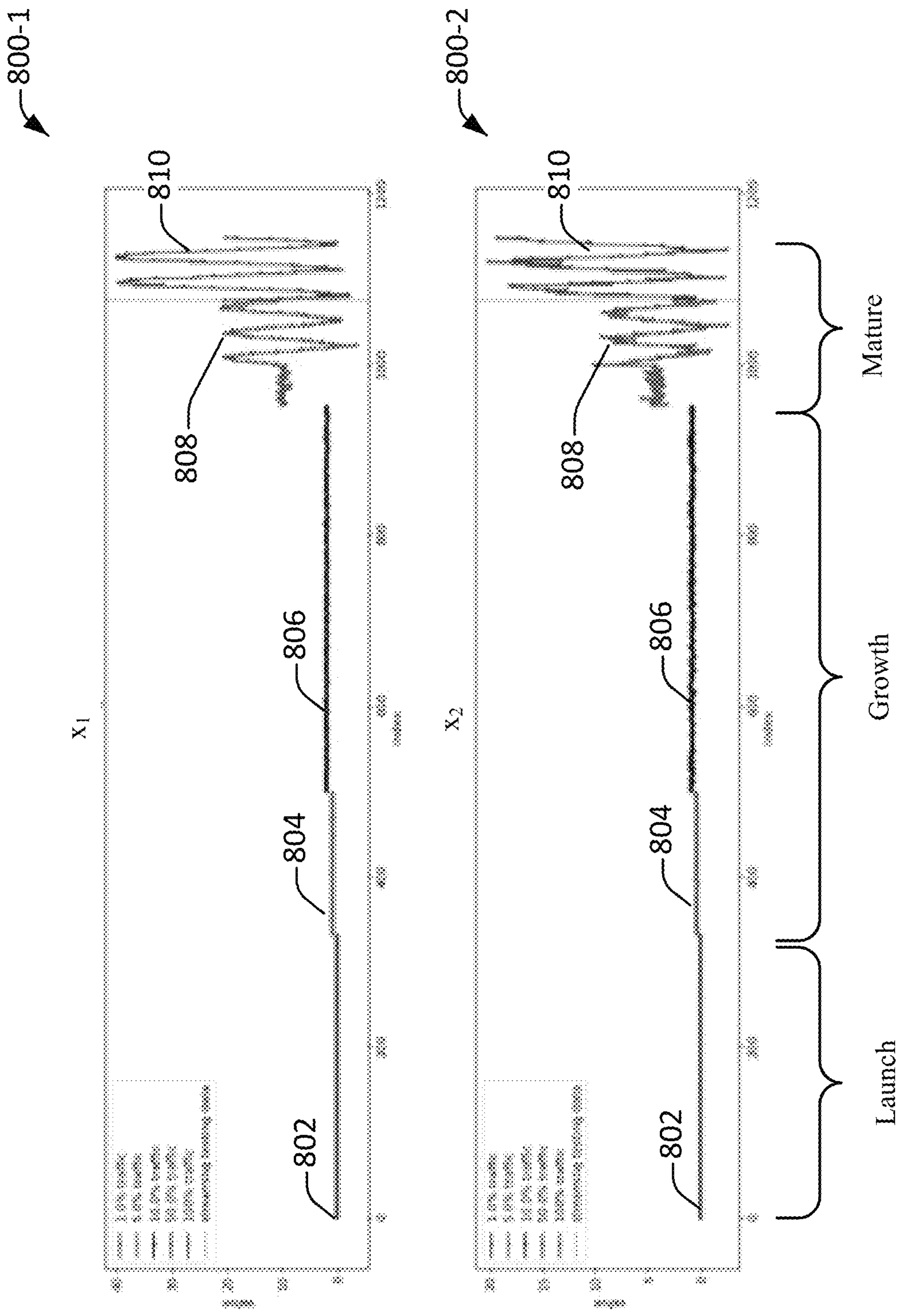
FIG. 8 depicts an example of the use of a delivery entity according to some embodiments.

In some embodiments, delivery entities 106 may be incrementally loaded, which causes differences in values for variables. For example, an incremental load provides incrementally more traffic (e.g., load) for a delivery entity 106 to process over time. That is, delivery entity 106 may deliver more content over time. In some embodiments, an incremental learning approach to discover the trending and expected behavior may be used as the growth, or a decline, of the use of a delivery entity. FIG. 8 depicts an example of the use of a delivery entity according to some embodiments. A graph 800-1 shown the incremental load of a first variable and a graph 800-2 shown the incremental load of a second variable. The amount of traffic that a delivery entity 106 is processing is shown. For example, at 802 in green, a 1% of a traffic load is being processed by the delivery entity 106; at 804 in pink, a 5% of a traffic load is being processed by the delivery entity 106; at 808 in dark blue, a 50% of a traffic load is being processed by the delivery entity 106; and at 810 in maroon, 100% of a traffic load is being processed by the delivery entity 106. The percentage of traffic that is processed is the amount of traffic that the delivery entity processes based on a maximum possible amount of load.

To account for the incremental loading process, anomaly detection engine 104 may weight the values in a queue differently. Also, anomaly detection engine 104 may use a dequeuing process to remove some instances of data as new instances of data are received. In some embodiments, anomaly detection engine 104 may weight the more recent instances of data higher than the older instances of data. This may put more emphasis on the more recent patterns compared to the older patterns. Emphasizing the more recent data in an incremental loading process may improve the anomaly detection because as the traffic load increases, different patterns may be experienced with the increased load. For example, in the launch phase, the value of the variables is relatively constant around a value of 1. Also, the growth phase, the value of the variables is relatively constant around a value of 2 or 3. Then, at the end of the growth phase, the value of the variables starts a new pattern where the data fluctuates much more around a value of 10 in graph 800-1 or a value of 5 in graph 800-2. The data may fluctuate even more in the mature phase.

By weighting the more recent instances of data that are received, the point in the space may better represent the current conditions. When instances of data are weighted higher, the corresponding points in the correlation space may affect how the boundary is drawn. For example, if points that are weighted higher are in one area of the space, then the boundary may be moved to encompass that area of the space more or be closer to that area of the space compared to another area of the space where the points are weighted lower. The weights may be expressed in different ways. For example, the weight can be expressed as an exponential decay function or be based on the traffic ratio that is used. For example, the weight may decay as the instances of data become older. Also, an instance while the traffic ratio is 1% may have a smaller weight than an instance while the traffic ratio is 50%.

Figure 9:
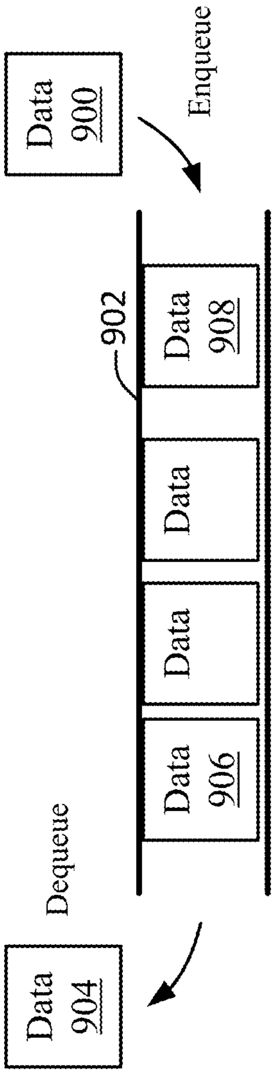
FIG. 9 shows an example of the queuing process according to some embodiments.

FIG. 9 shows an example of the queuing process according to some embodiments. At 900 an instance of data is received for a time. Then, anomaly detection engine 104 stores the instance of data in a queue 902. In a last in first out process, at 904, anomaly detection engine 104 removes an instance of data, such as the last instance of data that was inserted in queue 902. In some embodiments, queue 902 may store a time period of instances of data, such as instances from the last 30 days. The weights may be assigned based on the position in queue 902. For example, older instances in queue 902, such as at 906 may be weighted lower than newer instances, such as at 908.

Figure 10:
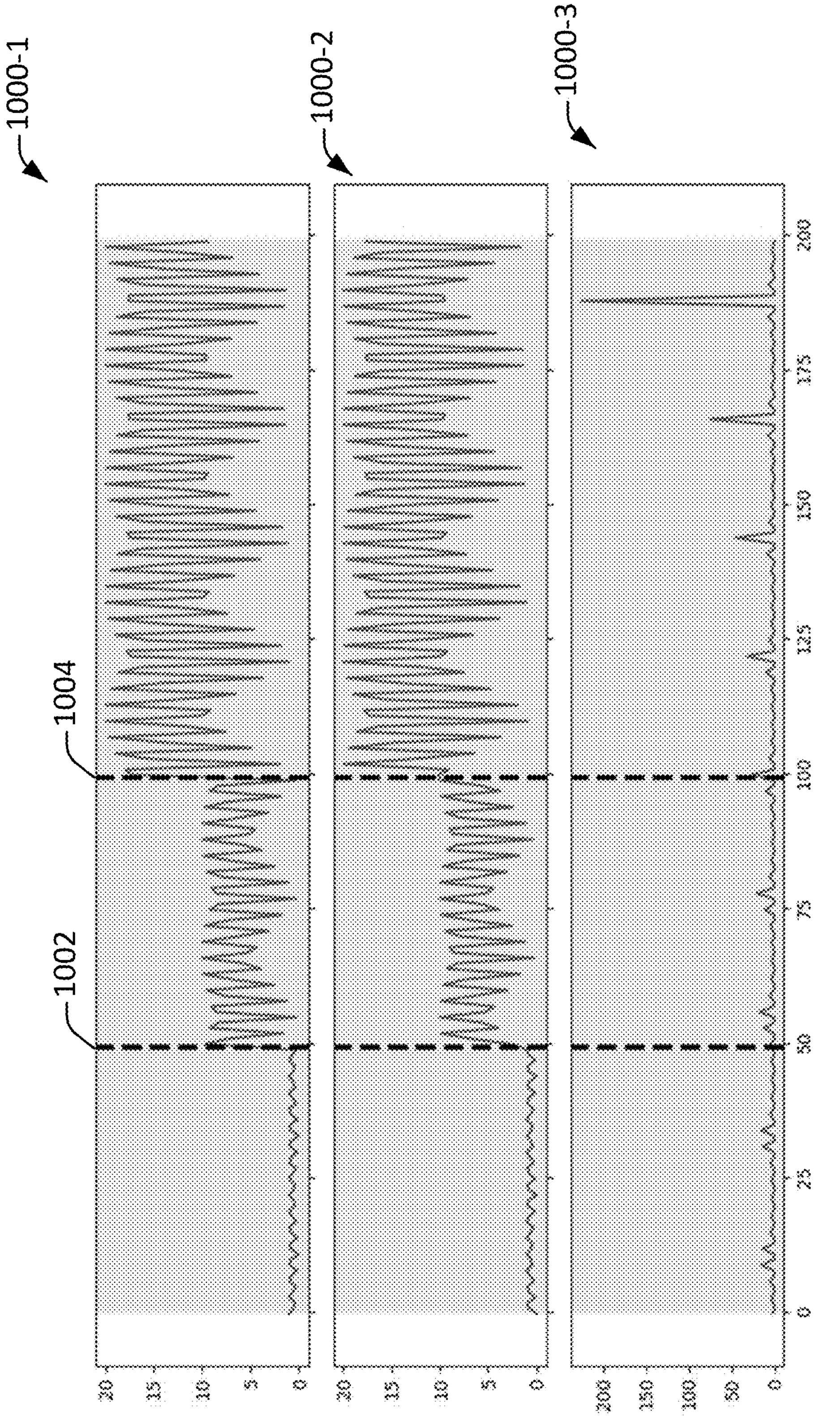
FIG. 10 depicts an example of determining change points according to some embodiments.

The above higher weighting of more current instances compared to older instances may also useful as data drifts. Anomaly detection engine 104 may also detect when change points occur in the instances of data. This may be helpful to detect abrupt changes in patterns rather than more subtle changes in data. That is, when data drifts into a new pattern, the higher weights to more recent instances of data may apply more weight to newer instances and help find anomalies to the new pattern faster. FIG. 10 depicts an example of determining change points according to some embodiments. A graph, 1000-1, 1000-2, and 1000-3 may illustrate multiple variables. All the graphs may be analyzed to determine a change point. A change point may occur when anomaly detection engine 104 detects that instances of data may significantly deviate from the previous instances of data, such as the changes are above a threshold. In some embodiments, anomaly detection engine 104 may use a sliding window, such as a fixed time sliding window, that may determine the values of instances of data within the sliding window. As the window slides across the time periods, anomaly detection engine 104 can detect when there is a significant change that is above a threshold compared to prior time windows. When the change meets the threshold, anomaly detection engine 104 determines a change point. For example, a first change at 1002 and a second change point at 1004 are shown. The change points occur when the instances of data change significantly. For example, before 1002, the instances of data may be relatively constant around a value of one. However, the values may start to change after a point 1.002 as the values now oscillate around a value of five for graphs 1000-1 and 1000-2. Also, after a point 1004, the values may start to oscillate around a larger range from the values of 2 to 20 for graphs 1000-1 and 1000-2. It is noted that some graphs may not indicate a change point, such as graph 1000-3 experiences relatively stable data points before point 1004.

Anomaly detection engine 104 may adjust the weights based on different detections of change points. For example, when a change point occurs, anomaly detection engine 104 may weight the instances of data before the change point less than the instances of data after the change point. For example, for graph 1000-1 and the variable for a graph 1000-2, the instances of data after change point 1002 may be weighted greater than the instances of data before change point 1002. Also, the instances of data after change point 1004 may be weighted greater than the instances before change point 1004 for graphs 1000-1 and 1000-2. The weights may use a different weighting method compared to the last in first out weighting. For example, the weights that are used before the change point may all be weighted lower than the weights after the change point, such as 10 percent weight for all instances before the change point and 90 percent weight for all instances after the change point.

Additionally, it can be seen that the values in graph 1000-3 do not change before change point 1004. Anomaly detection engine 104 may also weight the different variables differently. For example, if one variable is detected as being more important than another variable, then that variable may be weighted more. This may change the position of the point in this space based on the value of the variables that are weighted. Accordingly, anomaly detection engine 104 may determine that graph the variables for graph 1000-1 and 1000-2 may be weighted higher than the variable for graph 1000-3 because the graph for 1000-1 and 1000-2 may provide more information on the detection of anomalies because they have changed, but data in graph 1000-3 has not changed significantly. Accordingly, anomaly detection engine 104 may weight the variables for graph 1000-1 and 1000-2 higher than the variable for graph 1000-3.

The use of the weights may be useful in content delivery. Content delivery may experience data drift or incremental loading scenarios. The data drift may occur as viewing patterns of content change. Anomaly detection engine 104 is able to adapt to the data drift in real-time. Also, anomaly detection engine 104 can be used in an incremental load scenario with having to perform retraining with a batch of data. Rather, anomaly detection engine 104 learns the new patterns as load increases (or decreases).

The use of weights may be used when a cold start is used. A cold start may be where a model for anomaly detection engine 104 is used without considering any historical data. As the model learns which instances of data are anomalies, the weights can be used to assign higher weights to newer instances or instances after a change point occurs. This allows the dynamic retraining of the model. A warm start may also be similarly used. The model may be trained with some training data (e.g., historical data). Then, the model will dynamically learn how to detect anomalies as data changes as described in the cold start case.

The computations may be combined to parallelize the computation. For example, the covariances of two or more sets may be combined to paralyze the computation. That is, multiple instances of data may be combined into a single point in the space. This may improve the speed of the calculation.

CONCLUSION

Accordingly, anomaly detection engine 102 may perform anomaly detection without the need for a large amount of historical data for training. For example, no historical data may be used to perform the analysis for a cold start. The training of the model of anomaly detection engine 104 may also be ongoing as new data is received, which allows anomaly detection engine 104 to adjust in incremental loading cases or when data drifts. For example, the weights may be used to emphasize newer correlations or patterns as they occur.

System

Figure 11:
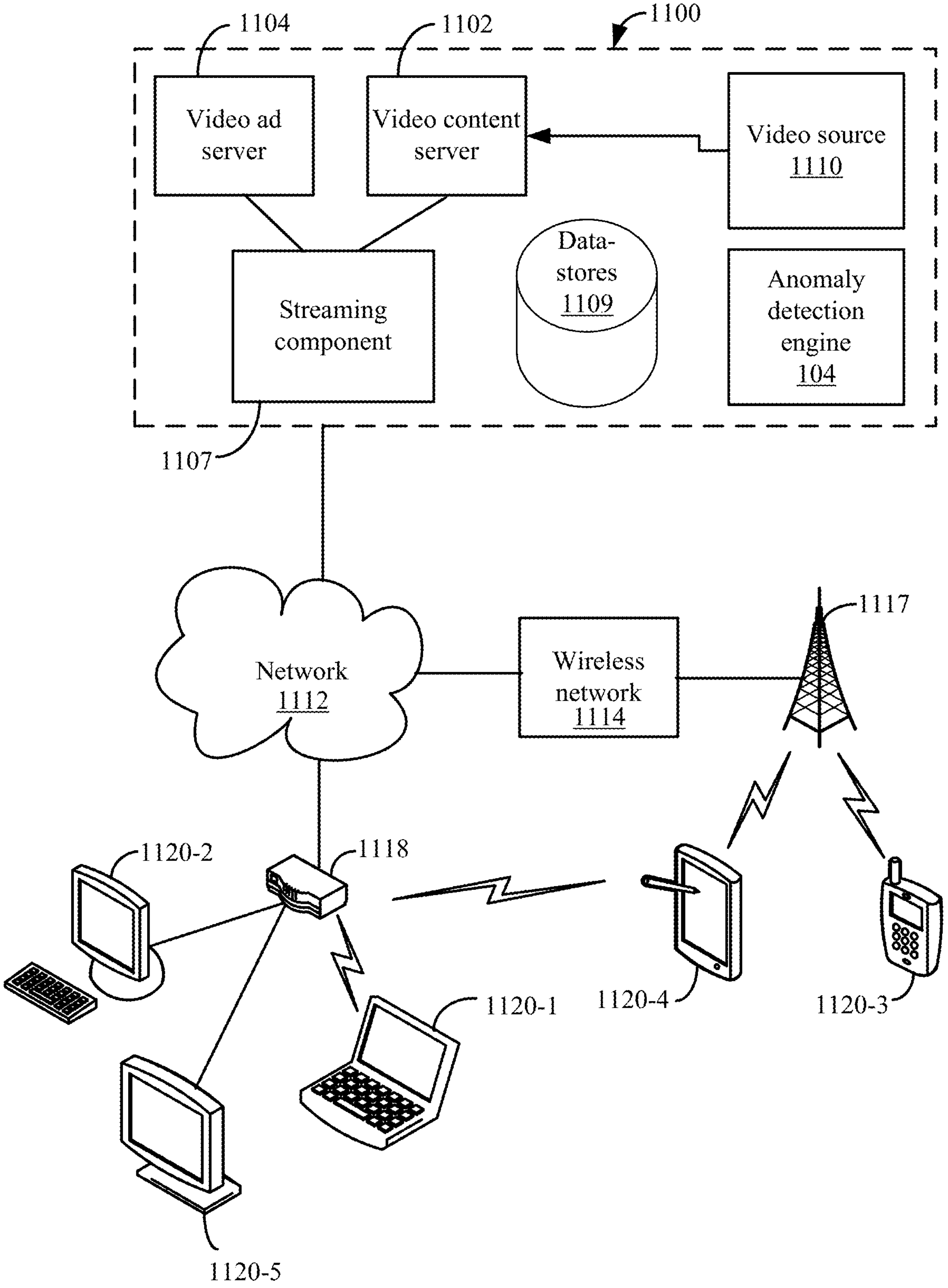
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 also may include anomaly detection engine 104.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless network 1114 (e.g., a wireless cellular telecommunications network (WCS)), or some combination of these or similar networks.

One or more client devices 1120 may be in communication with the video streaming system 1100, via the data communication network 1112, wireless network 1114, or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for wireless network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HyperText Transfer Protocol (HTTP) and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
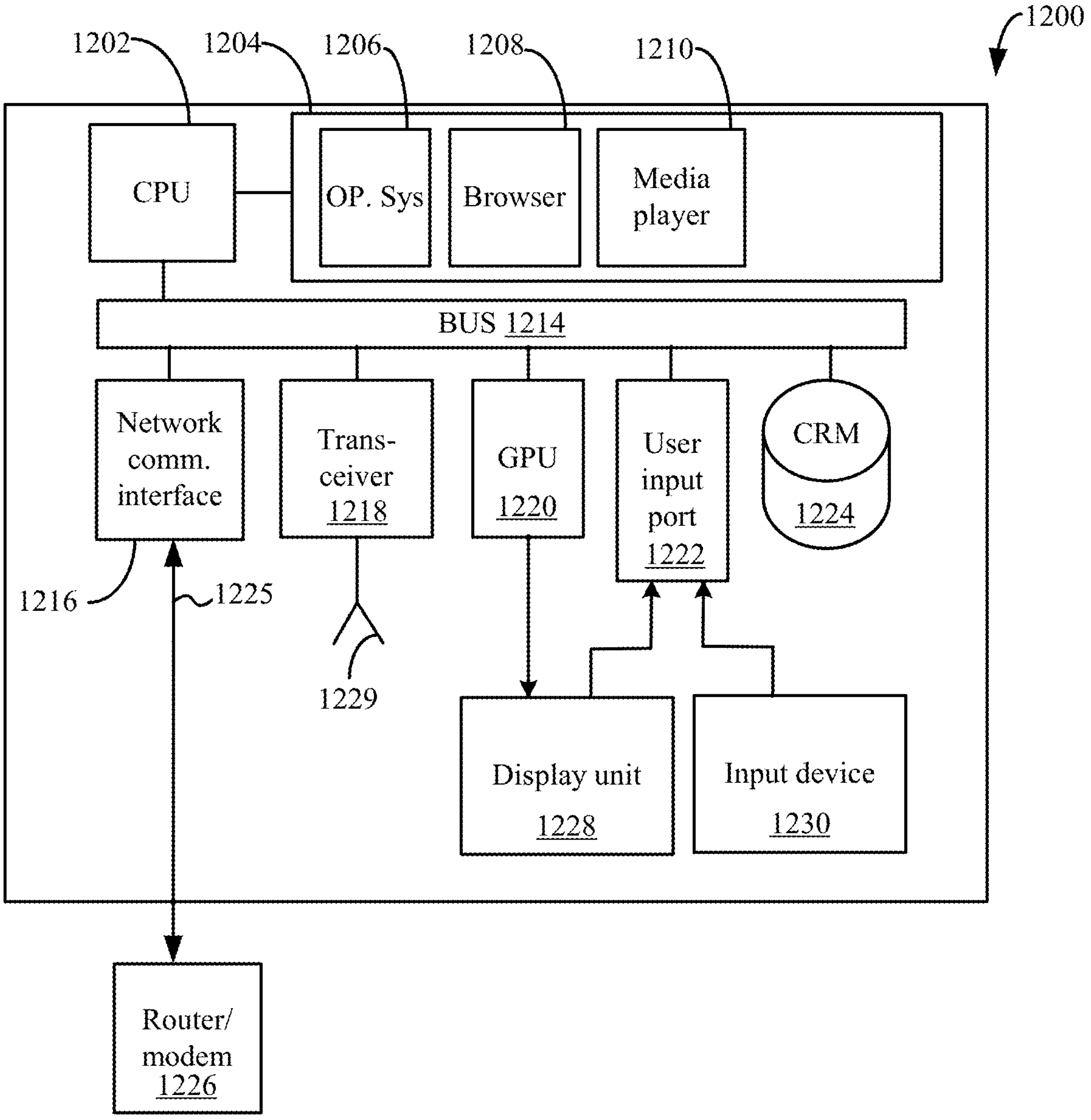
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules for operating system 1206, browser 1208, and media player 1210 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A network communication (comm.) interface 1216 may also be connected to the bus 1214. The network communication interface 1216 may provide or support two-way data communication between the apparatus 1200 and one or more external devices, e.g., the streaming system 1100, optionally via a router/modem 1226 and a wired or wireless connection 1225. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera, or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

receiving, by a computing device, a first instance of data for anomaly detection, wherein the first instance of data includes values from multiple variables;

storing, by the computing device, the first instance of data in a queue;

weighting, by the computing device, instances of data in the queue based on data changing over time;

projecting, by the computing device, the instances of the data in the queue into a space, wherein a point in the space represents a correlation of the values for the multiple variables for a respective instance of data, wherein the projecting of the instances of data is dynamically trained to detect the anomaly when data changes over time based on a changing of the weights assigned to instances of data in the queue;

generating, by the computing device, a boundary based on the points in the space; and determining, by the computing device, a point in the space that is considered an anomaly based on the boundary.

2. The method of claim 1, further comprising:

removing a second instance of data from the queue when storing the first instance of data in the queue.

3. The method of claim 2, wherein the second instance of data is an oldest entry in the instances of data in the queue.

4. The method of claim 1, wherein weighting the instances of data comprises:

weighting the first instance of data higher than a second instance of data in the queue, wherein the second instance of data was stored in the queue before the first instance of data.

5. The method of claim 1, wherein weighting the instances of data comprises:

determining a change point in the instances of data; and weighting instances of data that were stored after the change point higher than instances of data that were stored before the change point in the queue.

6. The method of claim 5, wherein detecting the change point comprises:

analyzing different windows of a number of instances of data in the queue; and determining the change point when differences between windows meet a threshold.

7. The method of claim 1, wherein each instance of data in the queue is associated with a point in the space.

8. The method of claim 1, wherein generating the boundary comprises:

determining the boundary based on a positions of points in the space.

9. The method of claim 1, wherein determining the point in the space that is considered the anomaly based on the boundary comprises:

selecting the point based on the point being considered outside of the boundary.

10. A method comprising:

receiving, by a computing device, a first instance of data for anomaly detection, wherein the first instance of data includes values from multiple variables;

storing, by the computing device, the first instance of data in a queue;

weighting, by the computing device, instances of data in the queue based on data changing over time wherein weighting the instances of data comprises:

weighting instances of data in the queue based on an amount of traffic load being handled by a delivery entity;

projecting, by the computing device, the instances of the data in the queue into a space, wherein a point in the space represents a correlation of the values for the multiple variables for a respective instance of data;

generating, by the computing device, a boundary based on the points in the space; and determining, by the computing device, a point in the space that is considered an anomaly based on the boundary.

11. A method comprising:

receiving, by a computing device, a first instance of data for anomaly detection, wherein the first instance of data includes values from multiple variables;

storing, by the computing device, the first instance of data in a queue;

weighting, by the computing device, instances of data in the queue based on data changing over time, wherein weighting instances of data comprises:

weighting a first variable in the instance of data with a first weight; and weighting a second variable in the instance of data with a second weight, wherein:

the first variable is weighted higher than the second variable when the first variable includes data that is changing more than the second variable;

projecting, by the computing device, the instances of the data in the queue into a space, wherein a point in the space represents a correlation of the values for the multiple variables for a respective instance of data;

generating by the computing device, a boundary based on the points in the space; and determining, by the computing device, a point in the space that is considered an anomaly based on the boundary.

12. The method of claim 11, wherein:

the first variable is considered more important than the second variable based on the data that is changing more.

13. A method comprising:

receiving, by a computing device, a first instance of data for anomaly detection, wherein the first instance of data includes values from multiple variables:

storing, by the computing device, the first instance of data in a queue;

weighting, by the computing device, instances of data in the queue based on data changing over time;

projecting, by the computing device, the instances of the data in the queue into a space, wherein a point in the space represents a correlation of the values for the multiple variables for a respective instance of data, wherein projecting the instances of the data comprises: determining a point in the space based on a correlation of values of the variables;

generating, by the computing device, a boundary based on the points in the space; and determining, by the computing device, a point in the space that is considered an anomaly based on the boundary, wherein the space comprises a higher dimensional space than a number of the variables.

14. A method comprising:

receiving, by a computing device, a first instance of data for anomaly detection, wherein the first instance of data includes values from multiple variables;

storing by the computing device, the first instance of data in a queue;

weighting, by the computing device, instances of data in the queue based on data changing over time;

projecting, by the computing device, the instances of the data in the queue into a space, wherein a point in the space represents a correlation of the values for the multiple variables for a respective instance of data;

generating, by the computing device, a boundary based on the points in the space;

determining, by the computing device, a point in the space that is considered an anomaly based on the boundary;

transforming the point to be a value on the boundary; and outputting the value for the point as the value in which the point will not be an anomaly.

15. A non-transitory computer-readable storage medium having stored thereon computer executable instructions, which when executed by a computing device, cause the computing device to be operable for:

receiving a first instance of data for anomaly detection, wherein the first instance of data includes values from multiple variables;

storing the first instance of data in a queue;

weighting instances of data in the queue based on data changing over time;

projecting the instances of the data in the queue into a space, wherein a point in the space represents a correlation of the values for the multiple variables for a respective instance of data, wherein the projecting of the instances of data is dynamically trained to detect the anomaly when data changes over time based on a changing of the weights assigned to instances of data in the queue;

generating a boundary based on the points in the space; and determining a point in the space that is considered an anomaly based on the boundary.

16. The non-transitory computer-readable storage medium of claim 15, wherein weighting the instances of data comprises:

weighting instances of data in the queue based on an amount of traffic load being handled by a delivery entity.

17. The non-transitory computer-readable storage medium of claim 15, wherein projecting the instances of the data comprises:

determining a point in the space based on a correlation of values of the variables, wherein the space comprises a higher dimensional space than a number of the variables.

18. The non-transitory computer-readable storage medium of claim 15, further operable for:

transforming the point to be a value on the boundary; and outputting the value for the point as the value in which the point will not be an anomaly.

19. The non-transitory computer-readable storage medium of claim 15, wherein projecting the instances of the data comprises:

determining a point in the space based on a correlation of values of the variables, wherein the space comprises a higher dimensional space than a number of the variables.

20. An apparatus comprising:

one or more computer processors; and a computer-readable storage medium comprising instructions for controlling the one or more computer processors to be operable for:

receiving a first instance of data for anomaly detection, wherein the first instance of data includes values from multiple variables;

storing the first instance of data in a queue;

weighting instances of data in the queue based on data changing over time;

projecting the instances of the data in the queue into a space, wherein a point in the space represents a correlation of the values for the multiple variables for a respective instance of data, wherein the projecting of the instances of data is dynamically trained to detect the anomaly when data changes over time based on a changing of the weights assigned to instances of data in the queue;

generating a boundary based on the points in the space; and determining a point in the space that is considered an anomaly based on the boundary.

* * * * *